April 24, 1962     D. R. PAQUETTE     3,031,617

LINEAR CAPACITIVE PROBE DETECTING DEVICE

Filed Aug. 13, 1958

INVENTOR
Donald R. Paquette
BY Arthur Vinograd
ATTORNEY

United States Patent Office 3,031,617
Patented Apr. 24, 1962

3,031,617
LINEAR CAPACITIVE PROBE DETECTING DEVICE
Donald R. Paquette, Washington, D.C., assignor to the United States of America as represented by the Secretary of Commerce
Filed Aug. 13, 1958, Ser. No. 754,907
3 Claims. (Cl. 324—61)

This invention relates to a capacitive probe type of displacement detecting or measuring device and particularly contemplates an improved capacitive-probe mechanism in which the capacity variation of the instrument is linearly related to the differential distance measured.

As is well known the capacitive principle of measuring extremely small distances and displacements is desirable from the standpoint of mechanical simplicity, small interaction with the object being measured, ease of electrostatic isolation, and the continuity of its transfer function.

In presently known capacitive-probe displacement detecting devices the nonlinearity between the capacitance variations of the instrument as the probe is adjustably positioned with respect to the surface being measured and the actual distance between the probe and the surface being measured requires the use of special and tedious calibration procedures in order to accurately determine the distance. Accordingly, once a capacitive probe of known type has been calibrated under one condition, extensive recalibration is needed before it can be applied to a different set of conditions. Moreover, once a calibration is effected for a particular range, because of the above-noted nonlinearity, the calibration factors cannot be extended to another range of measurement.

In accordance with the principles of the present invention a capacitive probe circuit is provided in which a highly linear relation between the capacity variations in the instrument and the distance being measured is obtained, and moreover, such calibration holds for an extended range of use and for different usage conditions to which the instrument may be put.

The manner in which such improvement is obtained will become apparent by considering certain fundamental relations involved.

While the surface being measured is not always subject to an observer's choice, it is usually some smooth surface with an equipotential plane very near the actual surface. Such equipotential surface together with the probe approximates a parallel plate capacitor in which a change in separation of the fiducial surfaces corresponding to the probe and equipotential surface respectively is the desired displacement to be measured. It can be shown that the transfer function of such a capacitive gage or measuring device has the mathematical form of a hyperbola $$C = \frac{\epsilon A}{d} \quad (1)$$

$$C = \frac{k'}{d} \quad (1a)$$

where $d$ corresponds to the separation between the probe and the surface being measured, $\epsilon$ is the dielectric permittivity of the space, $A$ is the area of the probe surface, and $C$ is the capacitance of the capacitive system defined by the probe and the surface being measured. The dependent variable corresponds to $d$ and $C$, the capacitance, is the independent variable. The function therefore is hyperbolic.

Since $C$ is the parameter actually being measured by the instrument in the use of the gage for determining distance $d$, then for the unit to have utility it is first necessary to establish a complete set of calibration points showing the relationship between $C$ and $d$ over the complete range of the instrument. Regardless of the number of calibration points obtained, however, because of the noted nonlinear relationships there will always exist some inherent error when interpolating between points on the calibration curve.

Since capacitor-type probes are generally employed to measure extremely small distances or displacements $\Delta d$, Equation 1a becomes $$d_0 + \Delta d = \frac{\epsilon A}{C + \Delta C} = \frac{\epsilon A}{C} \cdot \frac{1}{\left(1 + \frac{\Delta C}{C}\right)} \quad (2)$$

where $d_0$ is the initial distance, $\Delta d$ the differential distance or displacement to be measured, and $\Delta C$ represents the change in capacitance consequent to determining the distance or displacement $\Delta d$.

Solving for $\Delta d$ and expanding $$\Delta d = d_0 \left[ -\frac{\Delta C}{C} + \left(\frac{\Delta C}{C}\right)^2 + \ldots \right] \quad (2b)$$

Equation 2b indicates that in order to compute the desired differential distance $\Delta d$ from the measured capacitance $C$ and capacitive change $\Delta C$, the slope of the function or the ratio $d_0/C$ must accurately be determined at a particular point $d_0$ on the hyperbola plotted for the value of the above equation. Because of the high degree of accuracy required in measurements made at the close range contemplated, it is generally insufficient to rely on a linear approximation of the slope. While for a limited range, such slope may be used as a linear approximation, in actual practice, with prior art devices such limited range may be hard to obtain accurately and absolute calibration is not feasible. Empirical calibration is therefore employed and recalibration is necessary whenever the setting has been disturbed.

In accordance with the principles of the present invention the above-outlined hyperbolic transfer function relation of capacitance versus displacement can be compensated or linearized by applying an auxiliary circuit control in connection with the capacitive probe which has a reciprocal transfer function.

It is accordingly an immediate object of the present invention to provide a capacitive-probe type of measuring instrument or gage which has a linear calibration independent of the gaging capacitance.

It is an additional object of the present invention to provide a capacitive-probe type of gage which is substantially linear over its entire range.

A further object of this invention is to provide a capacitive-probe type of gage which is stable and maintains its calibration despite changes in location or application.

A still further object of this invention is to provide a capacitive-probe type of gage which enables the use of relatively large, mechanically feasible linear capacitors as a "read-out" capacitor.

Another object of this invention is to provide a capacitive-probe type of gage having a linearity which is relatively insensitive to the effects of stray capacitance.

A still further object of this invention is to provide a capacitance type of displacement measuring system employing a means of null balancing in which the detector sensitivity is not a function of the sensitivity of the displacement measuring means.

As will be shown as the description proceeds, in accordance with the principles of the present invention, linearity is independent of the gaging capacitance or in other words independent of the effective probe-diameter to displacement ratio. Accordingly it is a still further object of the present invention to provide a capacitive-probe type of gage enabling the use of small probe elements.

For the same reason, since the linearized probe does not require a large probe-diameter to displacement ratio, the capacitance detector need not be as sensitive as in prior art devices to obtain an equivalent degree of precision.

Moreover, the linearization feature of the invention is not limited to exactly parallel plate type of probes. Spheroidal probes which have a linear range may be employed. These spheroidal plates or spheroidal equipotential surfaces have less interaction from off-axis motion. As probe diameter to displacement ratios are small, off-axis motions do not result in large errors even in normal probe designs due to spheroidal equipotential surfaces.

Because of the extended range of linearity obtainable, mechanical construction, mechanical setting, and mechanical calibration tolerances are less severe than in prior art devices. A further object of this invention therefore is to obviate the need for micromanipulators in three dimensions as is necessary in prior art devices.

A still further object of this invention is to provide a high precision type of measuring gage which permits the use of switched unit capacitors as the "read-out" capacitor in order to increase the flexibility and range of the instrument.

Other uses and advantages of the invention will become apparent upon reference to the specification and drawings, in which.

Figure 1:
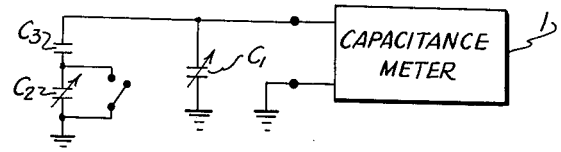
FIG. 1 is a schematic diagram illustrating the principles of the present invention.
Figure 2:
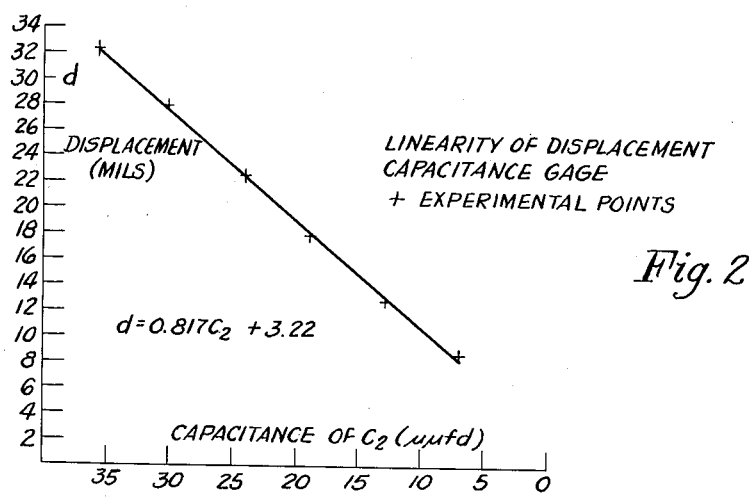
FIG. 2 is a plot showing the linear relationship between measured capacitance and the corresponding distance as a differential displacement achieved by the instrument of the present invention.

The manner in which linearity is achieved in the present invention by providing external circuitry for the probe which has a reciprocal transfer function can be demonstrated as follows. In FIG. 1, $C_1$ represents the gaging capacitance between a probe and the surface being measured. $C_2$ represents a linear variable capacitor such as a cylindrical piston condenser or a linear area type and $C_3$ is a fixed condenser. The capacitance combination of $C_1$, $C_2$, and $C_3$ is maintained constant by varying the adjustable read-out capacitor $C_2$. Then, writing the equation for the series-parallel capacitor configuration shown in FIG. 1, the total capacitance K of the circuit is $$C_1 + \frac{C_2 C_3}{C_2 + C_3} = K \tag{3}$$

The probe portion of the apparatus is defined by Equation 1a previously developed $$C_1 = \frac{k'}{d} \tag{4}$$

Substituting in Equation 3 and solving for $d$ then $$d = \frac{k'(C_2 + C_3)}{C_2(K - C_3) + C_3 K} \tag{5}$$

Since K represents the total capacitance of the system and $C_3$ is constant, the denominator of $d$ may be maintained constant by making the value of $C_3$ equal to K, i.e.

$$K - C_3 = 0$$

then Equation 5 reduces to $$d = \frac{k'(C_2 + C_3)}{C_3 K} \tag{5a}$$

or $$d = \frac{k'}{KC_3}(C_2) + \frac{k'}{KC_3}C_3 \tag{5b}$$

Since $C_3$ is a fixed capacitor in accordance with the construction shown in FIG. 1, then Equation 5b shows that measured distance is a direct function of $C_2$ in the apparatus of the present invention.

Also, the capacitance of $C_2$ may be expressed in terms of some parameter $(x)$ representing the surface area of its plates etc., $$C_2 = k''x + a \tag{6}$$

where $a$ represents some minimum stray capacitance. Therefore Equation 5b becomes $$d = \frac{k'k''x}{K^2} + \frac{k'a + k'C_3}{K^2} \tag{7}$$

or, in general, since $C_3$ or K is fixed in value $$d = mx + b \tag{8}$$

From Equation 8 it will be apparent that for a circuit construction according to FIG. 1 there is a linear relation between the measured capacitance change and the actual displacement of the probe.

As above indicated, a necessary criterion for the achievement of such linearity depends upon equating $K - C_3$ to zero. To make K equal to $C_3$ in the apparatus of FIG. 1, the variable capacitance of $C_1$ is reduced to zero by separating the probe 2, (FIG. 3) from the surface being measured and short circuiting $C_2$ by means of the switch indicated in FIG. 1. The variations in the system capacitance K are observed by the sensitive capacitance-indicating apparatus 1 and a null condition is readily obtained.

Such identity is accomplished without in any way altering the measuring circuit setup so that any stray capacitance in either the detecting circuit employed or the sensing circuit is maintained constant. This identity adjustment assumes that the behavior of the function is hyperbolic everywhere.

The stray capacity in the described circuit has no effect on the slope of the linearized relationship demonstrated. The differential calibration is always maintained as accurately as the fixed capacitor $C_3$ and the effective probe area. The stability of $C_3$ is no problem in the case of a fixed capacitor, and the probe area remains unchanged for a particular size of probe.

Moreover, such linearization characterizing the present invention enables flexibility of use of the apparatus. Regardless of where the instrument is set up, the calibration is maintained. This feature is especially useful when the measuring instrument must be moved to various testing positions.

Figures 3A, 3B:
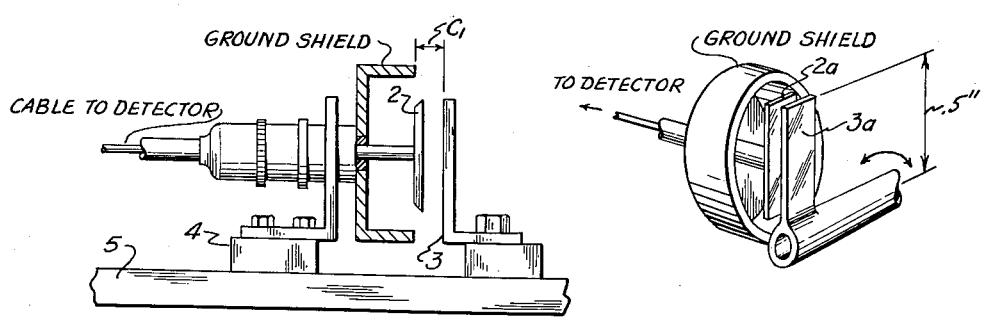
FIG. 3A is an illustration of a typical mounting arrangement for the capacitance probe.
FIG. 3B shows a modified type of probe that may be employed.
Figure 4:
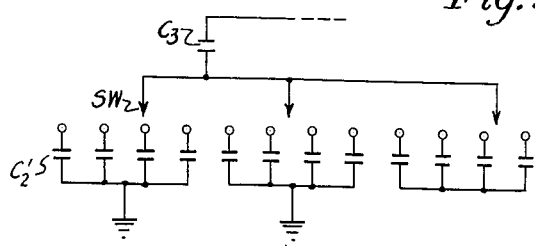
FIG. 4 shows a modification of the present invention showing the feasibility of using switched capacitors.

FIG. 3A shows one embodiment of a typical capacitive probe set up for implementing the circuit of FIG. 1. As is conventional, the probe 2 is fixed to a mount 4 which may comprise an adjustable carriage on a rigid bed 5. The surface 3 to be measured may similarly be adjustably secured to the bed 5. By employing a lathe type of machine tool base for the supporting mechanism, it will be readily apparent that the position of the probe 2 relative to test surface 3 can be accurately controlled in response to observations of the indicating instrument 1.

In operation, the system capacitance K is sensed by the sensitive capacitance instrument 1. As $C_1$ (corresponding to the capacitance of the probe 2 and surface 3 being measured (FIG. 3)) is adjusted in making a measurement, any change in the magnitude of K resulting from such variation is nulled by manipulating adjustable readout capacitor $C_2$. The resulting change of capacitance of read-out capacitor $C_2$ is a measure of the change of spacing of the gaging capacitance $C_1$.

It will be apparent that the embodiments shown are only exemplary and that various modifications can be made in construction and arrangement within the scope of invention as defined in the appended claims.

What is claimed is:

1. In an instrument for measuring the capacitance of a first capacitor comprising a probe electrode located opposite a surface, means for moving said probe electrode relative to said surface so that the capacitance of said first capacitor varies as a function of the perpendicular distance between said probe and surface, a first and second terminal, means connecting said second terminal to ground, means connecting said first capacitor between said first and second terminal, a fixed capacitor, a substantially linear, variable capacitor, said fixed and variable capacitor being connected in series and across said first and second terminal, said fixed capacitor having a value and said first and variable capacitor each having a range of values such that the equivalent capacitance appearing across said first and second terminal may be maintained substantially constant as the distance between said probe and electrode is varied, said variable capacitor being calibrated as a linear function of the perpendicular distance between said probe and surface, and a null-indicating, capacitance meter connected across said first and second terminal.

2. The instrument set forth in claim 1 including means for short circuiting said variable capacitor.

3. The instrument set forth in claim 1 wherein said fixed capacitor has a first and second connecting point and said variable capacitor comprises a plurality of capacitors, said first connecting point being connected to said first terminal, a plurality of switches, each having a contact arm and a plurality of terminals, each contact arm being connected to the second connecting point of said fixed capacitor, and means for connecting each of said plurality of capacitors between a respective terminal of said switches and said second terminal.

References Cited in the file of this patent

UNITED STATES PATENTS

| | | |
|---|---|---|
| 1,350,279 | Howe | Aug. 17, 1920 |
| 2,510,822 | Jacot et al. | June 6, 1950 |
| 2,742,609 | Black et al. | April 17, 1956 |
| 2,880,390 | Calvert | March 31, 1959 |
| 2,932,970 | Zito | April 19, 1960 |

OTHER REFERENCES

Radio World, "Capacity Measurements, All Ranges," May 1936; pages 47–53.

Boella: "Direct Measurement of the Loss Conductance of Condensers at High Frequencies," Proc. of the I.R.E., vol. 26, No. 4, April 1938; pages 421–432.

Alexander, Jr.: "Dielectric Constant Meter," Electronics, April 1945; pages 116–119.

Klemm: "Simple Capacimeter," Radio-Electronics, June 1954; page 67.